Figure 1:
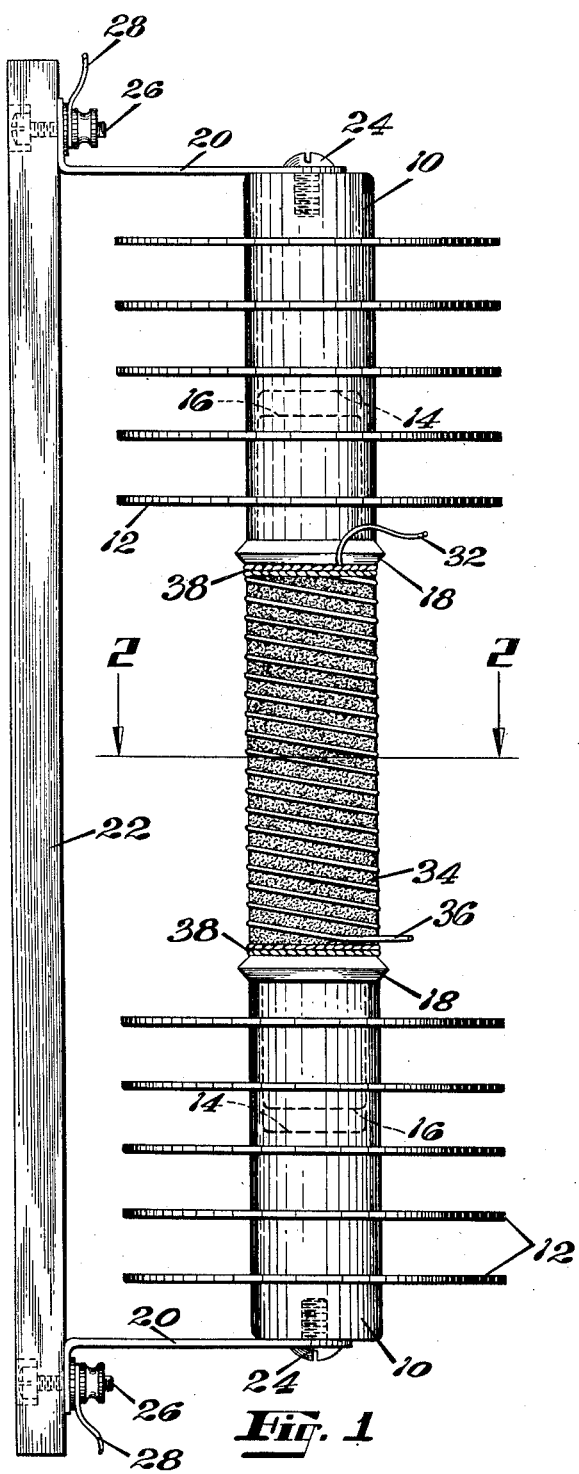

May 22, 1951 — W. K. COBURN — 2,554,440

METEOROLOGICAL INSTRUMENT

Filed Feb. 21, 1946 — 2 Sheets-Sheet 1

INVENTOR.
William K. Coburn.
BY
Attys.

May 22, 1951 W. K. COBURN 2,554,440
METEOROLOGICAL INSTRUMENT
Filed Feb. 21, 1946 2 Sheets-Sheet 2
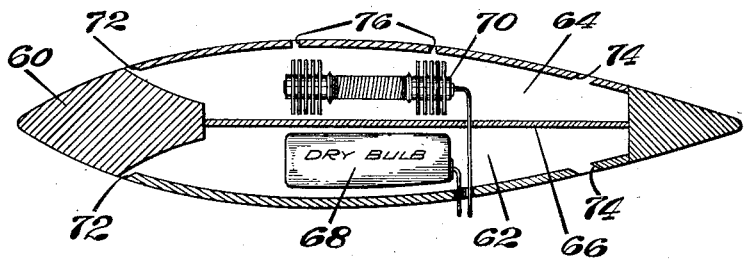
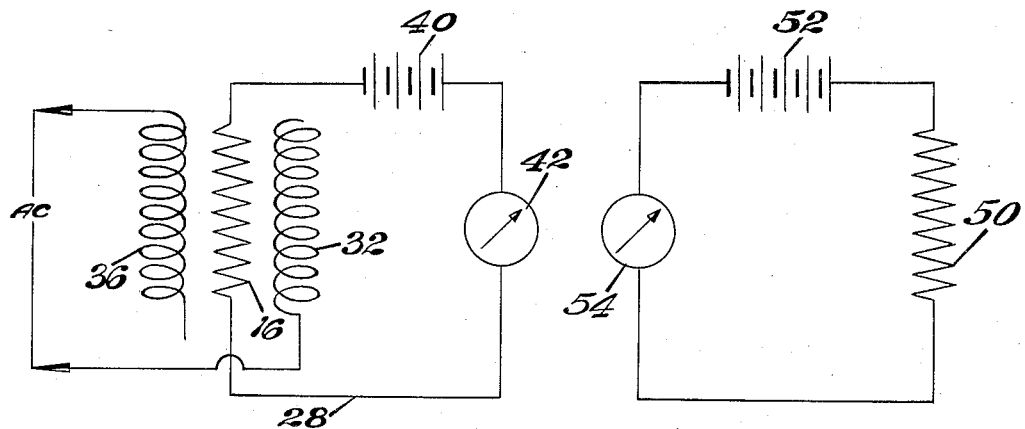
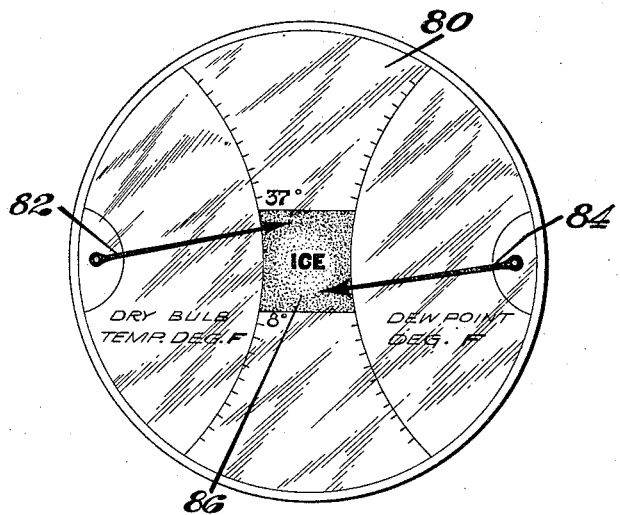
INVENTOR
William K. Coburn
BY Kenway & Witter
ATTORNEY Patented May 22, 1951

2,554,440

UNITED STATES PATENT OFFICE 2,554,440

METEOROLOGICAL INSTRUMENT

William Knowlton Coburn, Cambridge, Mass., assignor to Serdex, Inc., Boston, Mass., a corporation of Massachusetts Application February 21, 1946, Serial No. 649,248

3 Claims. (Cl. 73—336)

My invention relates to meteorology and in particular comprises a new and improved instrument for measuring and correlating dew point and dry bulb temperatures. Included within the scope of the invention is a novel unit for the measurement of vapor pressure.

Although the instrument of my invention may be used with advantage in many different phases of meteorology, it is particularly valuable for use on aircraft, where it may serve to inform the pilot or navigator of atmospheric conditions favorable to the formation of ice at or upon any given location on the plane.

It is impossible to predict with accuracy the occurrence of atmospheric conditions favorable to the formation of ice, especially when it is considered that atmospheric conditions vary markedly with slight change in altitude. It has long been realized that the formation of ice upon the wings or upon the carburetor air intake can very rapidly and dangerously impair the functioning of the wings or the engines to such an extent that the pilot loses control and crashes. Although many attempts have been made to devise instruments for measuring dew point and dry bulb temperatures and for indicating the relative values of these factors, it has been found in general that instruments heretofore available are either inaccurate or too slow in responding to changes in atmospheric conditions; the problem has not hitherto been satisfactorily solved.

I have invented an instrument which constantly measures and indicates the temperature of the air and a function of the dew point. The measurements are effected by electric circuits arranged to move a pair of pointers across the face of the dial. One pointer plays across a scale calibrated in terms of air temperature, while the other pointer plays across a scale calibrated in terms of dew point. There is a range of dry bulb temperatures extending from approximately 8° F. to about 37° F. which lies opposite a corresponding range of dew point temperatures on the other scale. Consequently, it is possible to outline on the scale a danger area, in the sense that when both of the pointers are above the area the instrument reflects atmospheric conditions favorable to the formation of ice. In the course of a flight the pilot or navigator can check the dial from time to time to see whether the pointers are approaching the danger area. The approach of the pointers to the danger area is an expression of a change in atmospheric conditions, and a steady progression of the pointers toward the danger area is a strong indication that the plane will be subjected within a reasonably short time to icing conditions. With such warning the pilot may seek an altitude at which ice will not form. If he is successful in reaching a stratum in which atmospheric conditions are unfavorable to the formation of ice, the pointers, or one of them, will move away from the danger area and it may well be that the flight can safely be continued at the new altitude.

The invention is based upon the principle that certain salts increase in electrical conductivity as they take on moisture from a surrounding gaseous medium such as air and that heat is generated in the salts when a current of electricity is passed through them. By disposing a wick saturated with a solution of a salt, such as lithium chloride or calcium chloride, between a pair of electrical contacts and applying a potential across the contacts it becomes possible to measure the partial pressure of water vapor in the surrounding atmosphere. When the salt in the wick takes on moisture from the atmosphere and becomes conducting, the heat generated by the passage of the current through the salt will dry it until a condition of equilibrium has been set up at which the salt gives off moisture at the same rate at which it is taken on. At this condition of equilibrium the salt becomes substantially non-conducting and cools down. As more moisture is absorbed from the atmosphere the salt again becomes conducting and the cycle is repeated. It has been proposed to measure the amount of current thus passed through the salt-impregnated wick. However, there is so much lag or hysteresis involved that the measurement of the amount of current flowing through the salt-impregnated wick is not an accurate reflection of the vapor pressure of the surrounding atmosphere. The lag is multiplied in effect by the speed of a plane to such an extent that an instrument responsive to the amount of current flowing through the wick is useless.

I have discovered, however, that the amount of heat generated in the wick is a direct function of the partial pressure of water vapor in the surrounding atmosphere and that if means are provided for conducting the heat away from the wick as fast as it is generated, it is possible to measure the heat generated by the wick and thus obtain an accurate reading of the instantaneous vapor pressure in the surrounding atmosphere. To measure the heat so generated I prefer to employ an electrical measuring circuit including a thermally responsive resistor closely associated with the salt-impregnated wick.

Figure 2:
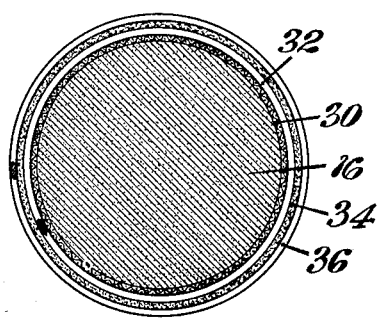

The objects and features of my invention will be more readily understood and appreciated from the following detailed description of a preferred embodiment thereof selected for purposes of illustration and shown in the accompanying drawings, in which:

Fig. 1 is a view in side elevation of a vapor pressure responsive element constructed in accordance with my invention, Fig. 2 is a view in cross section along the line 2—2 of Fig. 1, Fig. 3 is a view in cross section through a unit constructed for use with aircraft, Fig. 4 is a schematic wiring diagram showing a preferred measuring circuit, and Fig. 5 is a plan view of the indicating element suitable for mounting in an instrument panel.

The dew point or humidity responsive element is shown in detail in Figs. 1 and 2. From a solid cylinder of copper or other suitable metal I form two identical radiating support members 10. Each of the members 10 is cut to form a central cylindrical portion and five integral circular fins or disks 12; the thickness of the radiating fins 12 is not critical, but I have found a thickness of .010" to be quite satisfactory. Each of the members 10 is bored internally from one end to form a tubular socket 14 for the reception of one end of a resistor 16 having adjacent each end an integral shoulder 18 against which the ends of the radiating members 10 are seated. The resistor 16 is thermally responsive; that is to say, its resistance varies with its temperature. I prefer to use a negative temperature coefficient resistor, although a thermistor may alternatively be employed. A pair of brackets 20 are secured to a strip 22 of hard insulating plastic, polystyrene, or other suitable insulating material. The ends of the brackets 20 are secured to the outer ends of the copper members 10 by means of a pair of screws 24. The hard insulating plastic strip 22 is provided with a pair of binding posts 26 which secure the brackets 20 to the strip 22 and also serve as terminals for a pair of leads 28. The leads 28 are connected to the opposite ends of the resistor 16 through the brackets 20 and through the copper radiating members 10.

The body of the resistor 16 intermediate the shoulders 18 is wrapped with a layer of fiber glass impregnated with a silicone composition which renders it electrically but not thermally insulating. The thickness of the fiber glass wrapping may conveniently be of the order of .004". Upon the fiber glass wrapping 30 I wind a bare wire 32 of silver or palladium wrapped around which is a wick 34 of fiber glass impregnated with a salt solution. The characteristics of lithium chloride particularly well adapt that salt for use in the instrument of my invention, but other salts, to a lesser degree, exhibit similar characteristics and may be used if desired. For example, calcium chloride or ammonium chlorate may be used for the purpose. A suitable impregnation may be secured by dipping the wick in a lithium chloride solution at 100° F. and drying it at 250° F. The thickness of the wick is not critical but I have found a thickness of .005" to be highly satisfactory. Around the wick 34 I wind a second coil of bare wire 36. I have found that a diameter of .010" is satisfactory for the wire of both the coils 32 and 36. To secure the wrappings and coils in place I wind about the outside of the element and adjacent the shoulders 18 a few turns of fiber glass thread 38.

As shown in Fig. 4 one end of each of the coils 32 and 36 is left free and unconnected, while the other end of each of the coils is connected across a source of alternating current. The function of the coils 32 and 36 is that of electrodes across which the wick is connected. Thus alternating current is passed through the wick. The leads 28 from the resistor 16 are connected to opposite terminals of a battery 40 through an ammeter 42. It is to be understood that any source of direct current may be substituted for the battery 40.

I have now described in detail the dew point indicating circuit. When the element is exposed to the atmosphere the wick 34 will take on moisture and become conducting. The passage of the alternating current through the wick will generate heat, and the heat thus generated will be transmitted from the fiber glass wrapping 30 to the resistor 16. The heat is then conducted from the resistor 16 through the copper supports 10 and radiated by the fins 12. As the wick is heated it dries out until an equilibrium temperature is reached, the salt in the wick no longer conducts current, and the wick begins to cool off and take on more moisture. Consequently the wick again becomes conducting and generates heat. The function of the radiating fins is important in this regard because the element would not be sufficiently sensitive if the heat were not conducted away from the wick and the resistor at a reasonable rate. However, the relatively rapid dissipation of the heat through the radiating fins 12 results in a most delicate and sensitive element.

The negative temperature coefficient resistor 16 is of course responsive to temperature changes and thus its value reflects the vapor pressure of the wick which in turn is a function of the vapor pressure of the surrounding atmosphere, in view of the particular combination of elements above described. It thus becomes possible to calibrate the ammeter 42 in terms of dew point or vapor pressure.

As shown in Fig. 4 I also provide a second negative temperature coefficient resistor 50 which is exposed to the atmosphere and connected across a battery 52 through an ammeter 54. The value of the resistor 50 changes with the temperature of the surrounding atmosphere, with the result that the ammeter 54 may be calibrated in terms of dry bulb temperatures. By correlating the readings of the ammeter 52 and 54 it is possible to determine whether or not the existing atmospheric conditions are suitable for the formation of ice; of course, the instrument thus far described may be used wherever it is desirable to obtain dew point and dry bulb temperature readings.

For application to aircraft I provide the unit shown in Fig. 3 wherein a stream-lined metal casing or housing 60 is hollowed internally to provide two adjacent chambers 62 and 64 separated by a partition 66 of any suitable thermal insulation material. In the chamber 62 is mounted a dry bulb unit 68 consisting of a properly supported negative temperature coefficient resistor. In the chamber 64 I mount a dew point unit 70 of the type shown in Fig. 1 and described in detail above. The forward end of each chamber 62 and 64 is provided with an inlet 72 through which air passes to reach the interior of the chambers. Each of the chambers is also provided with an exhaust passage 74 through which air leaves the chambers. In one wall of the casing 60 I provide a pair of holes 76 by means of which the unit may be mounted at any desired point on a plane. I contemplate mounting the unit at or near the leading edge of one of the wings. The measuring circuits are similar to those shown in Fig. 4, but the two ammeters 42 and 54 shown in Fig. 4 may be combined in one case having a dial 80 as shown in Fig. 5 and associated with a pair of pointers 82 and 84. The pointer 82 is driven by the ammeter included in the circuit with the exposed or dry bulb resistor 68, and the pointer 84 is driven by the ammeter associated in the circuit with the dew point unit. An arcuate scale underlies each of the pointers 82 and 84 on the dial 80. The scale underlying the pointer 82 is calibrated for dry bulb temperatures while the scale underlying the pointer 84 is calibrated for dew point temperatures.

As a practical matter ice will form only when the dry bulb temperature is between 8° F. and 37° F. and when there is only a relatively small difference between the dry bulb temperature and the dew point. Consequently, there is on the dial 80 an area, indicated by the reference character 86 and lettered with the word "Ice," which may be regarded as the danger or icing area. That is to say, when both the pointers 82 and 84 are playing over this area, the instrument is reflecting a condition in the atmosphere favorable to the formation of ice. Conversely, if either or both of the pointers are outside the danger area, atmospheric conditions are not favorable to ice formation. When the pilot sees that the pointers are both approaching the danger area, he is warned that ice may form on his plane and may take such measures as he deems proper to avoid the threatened danger. That is to say, he may land or seek an altitude at which the conditions will not favor the formation of ice.

Ice forms not only on the wings of planes but also upon the carburetor intake and is very dangerous in either location. However, it is only necessary to employ one dew point system since the vapor pressure of the atmosphere will not vary from place to place along the plane. However, the dry bulb temperature is effected by the air speed of the plane and by the geometry at various locations on the plane, since adiabatic heating or cooling are functions of local compressions or rarefactions respectively, forced in the air streams by the local geometry involved. Consequently, additional dry bulb units may be disposed at various points about the plane and arranged (by means not shown) to be selectively included in the measuring circuit. By switching from one dry bulb location to another, the pilot or navigator is enabled to check the conditions at the various critical points along the plane.

It is important to note that alternating current is applied across the wick, since a direct current would cause polarization of the salt solution. Of course, the voltages used will depend upon the available power as well as upon the dimensions of the various parts of the unit. I have found that alternating current at twenty volts will give satisfactory results across the wick and that from two to six volts direct current is satisfactory in the measuring circuit when the ammeter operates at 20,000 ohms per volt and when the negative temperature coefficient resistor has a value of approximately 50,000 ohms at 100° F. These figures merely represent data relating to one successful embodiment of the invention, and those skilled in the art will readily appreciate the factors involved and be able to select the proper values of resistance, voltage, etc. to construct a satisfactory instrument.

Having thus disclosed my invention, what I claim as new and desire to secure by Letters Patent of the United States is, 1. A device of the class described which comprises, an apertured metal block having integral radiating fins, a thermally responsive resistor received at one end in the aperture of said block, a thin layer of electrical but not thermal insulation disposed about said resistor, a bare wire wound about said layer, a wick carrying a salt solution and wound about said wire, a second bare wire wound about said wick, means for applying alternating current to said wire windings, means for applying direct current across said resistor, and means for measuring the value of said resistor.

2. A device of the class described comprising an elongated negative temperature coefficient resistor, a wick disposed around said resistor, a solution impregnating said wick and capable of conducting electricity and generating heat as a function of its vapor pressure, a metal member disposed in heat conductive relation to said resistor, heat radiating means secured to said member, means for passing alternating current through the wick and the solution, and measuring means connected to said resistor for measuring variations in electrical values responsive to variations in the value of the resistor.

3. A device of the class described comprising a pair of metal socket members, a heat radiating fin secured to each of said sockets, a negative temperature coefficient resistor held in said sockets and in heat conductive relation to the walls thereof, a wick wrapped about said resistor and impregnated with a salt solution capable of conducting electricity and generating heat as a function of its vapor pressure, means for passing alternating current through said wick, and means connected to said resistor for measuring and indicating variations in the value of the resistor.

WILLIAM KNOWLTON COBURN.

REFERENCES CITED

The following references are of record in the file of this patent:

UNITED STATES PATENTS

| Number | Name | Date |
| --- | --- | --- |
| 822,338 | Bennett | June 5, 1906 |
| 2,019,355 | Nickle | Oct. 29, 1935 |
| 2,044,239 | Bullock | June 16, 1936 |
| 2,093,767 | Rollefson | Sept. 21, 1937 |
| 2,295,570 | Dunmore | Sept. 15, 1942 |
| 2,359,278 | Allen | Oct. 3, 1944 |